3,272,908
COMBINED COVER MEMBER AND MOUNT
Joel K. Beecher, Morristown, N.J., assignor to Tung-Sol Electric Inc., a corporation of Delaware
Filed July 17, 1964, Ser. No. 383,399
2 Claims. (Cl. 174—52)

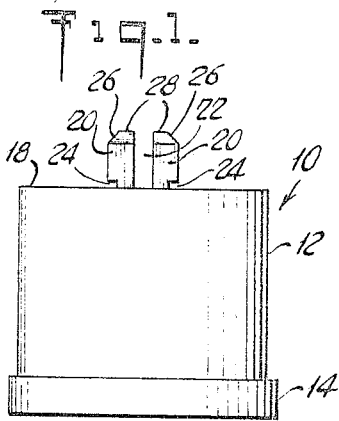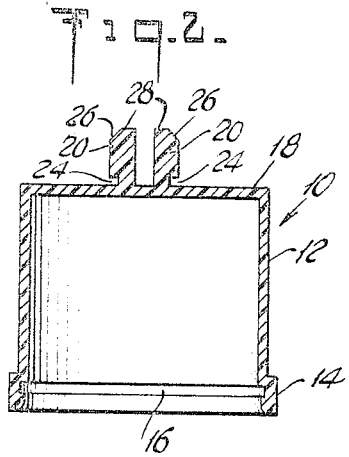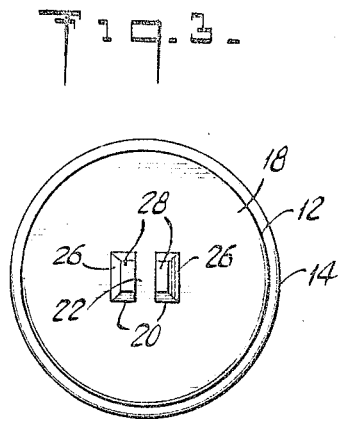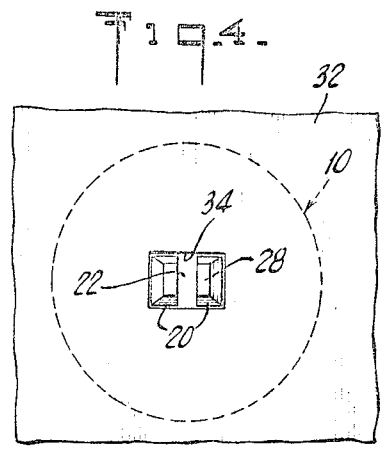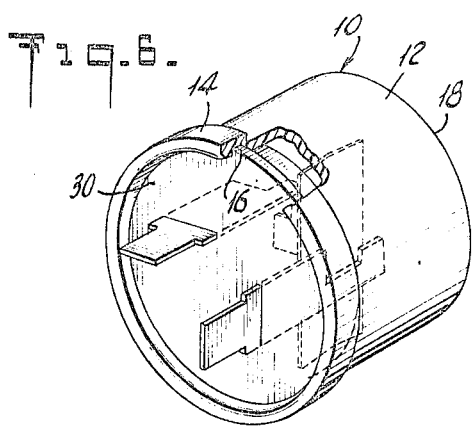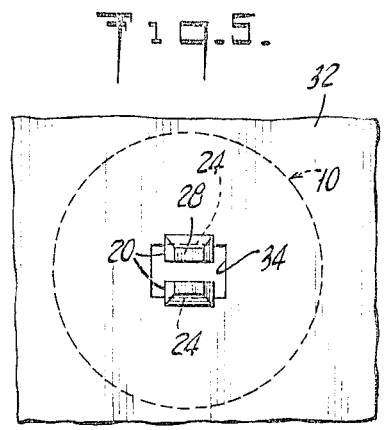
INVENTOR
JOEL K. BEECHER

The present invention relates to mounting means for small electrical devices as, for example, flashers for automobile directional signals. The invention comprises a unitary plastic casing which serves not only to enclose the electrical unit but also as the means for mounting the unit in an aperture in a wall. The invention will be described with particular reference to its employment in connection with flashers as it has prime utility in this field but it will be understood that the particular electrical unit within the combined container and mount forms no part of the present invention as the structure of the invention could equally well be employed for mounting devices other than flashers.

Directional signal flashers are in wide commercial use and are more or less standardized in size for passenger automobiles. The usual flasher comprises elements mounted on a disc base of molded plastic material through which extend the terminals for connection to the electrical circuit. Enclosing the elements of the flasher and crimped about the periphery of the base is a metal can to protect the flasher elements from dust and humidity. In order to mount such flasher, a separate bracket is provided that grips the metal can and is provided with means for attachment to a wall or the like in the automobile. The present invention eliminates the usual bracket and replaces the usual metal can by a plastic cover which is provided with lugs which serve as the fastening means for attachment of the device to the automobile wall. The lugs of the container are so shaped as to be insertable into a rectangular or other shaped aperture in a wall and then the device is rotated through 90° to lock the device to the apertured wall. The lugs which are formed integral with the container comprises two outstanding parts connected to the container proper by thinner sections which permit the two parts to be forced together during rotation of the device in the aperture. The thinner sections provide slots for reception of wall sections adjacent the aperture and the resiliency of the plastic material causes the lugs to firmly grasp the wall.

For a better understanding of the invention and of a preferred embodiment thereof, reference may be had to the accompanying drawing of which:

FIG. 1 is a side view of a combined casing and lug mount representing the preferred embodiment of the invention;

FIG. 2 is a vertical sectional view through the device of FIG. 1;

FIG. 3 is a top plan view of the device of FIG. 1;

FIG. 4 is a plan view showing a part of a wall with the lugs of the device of FIG. 1 inserted therein;

FIG. 5 is a view similar to FIG. 4 but showing the parts in the locked position after rotation of the device through 90°; and FIG. 6 is a perspective view of the device of FIG. 1, partly broken away to show a flasher within the casing.

As shown in FIGS. 1 through 3 the combined casing and lug mount 10 comprises a shell or cup 12 of plastic material having an enlarged mouth 14 within which is an annular groove 16 and having on the closed upper end 18 a pair of upstanding lugs 20 separated by a gap 22. Each lug 20 has an undercut section 24 and a tapered wall portion 26 terminating in upper flat portions 28. The reduced thickness of the lug portions about the undercut 24 permits relative movement between the lugs to close the gap 22 so that when the lugs are forced together the inherent resiliency of the plastic material causes the lugs to tend to return to their initial positions.

As shown best in FIG. 6 the groove 16 which is formed by a thinning of the wall in the section 14 is dimensioned for reception of the base 30 of a flasher, the casing 12 being sufficiently thin-walled to permit the flasher to be forced into the casing until the base 30 snaps into the groove 16.

In FIGS. 4 and 5 a section of a wall upon which the device is to be mounted is illustrated at 32. Ordinarily a rectangular hole such as that shown at 34 in FIGS. 4 and 5 is provided for reception of the usual bracket or mount. The spacing between the outer side vertical walls of the lugs 20 is substantially equal to the length of the hole 34 but can be wider or narrower. If the length of the hole 34 is less than the distance between the outer vertical walls of the lugs 20, the sloping sections 26 permit the lugs to be forced into the hole 34, the lugs yielding under the pressure exerted by the sides of the hole 34. FIG. 4 illustrates the position of the lugs after insertion into the hole 34. To lock the lugs in the wall 32 the device 10 with the flasher therein is rotated through 90° to bring the lugs 20 into the position shown in FIG. 5. The height of the undercut section 24 of the lugs is substantially equal to the thickness of the wall 32. Accordingly when the device is rotated, the material of the wall 32 along the longer sides of the hole 34 enters the undercut sections 24 and forces the lugs together, locking the lugs to the wall 32 and preventing accidental separation. If the wall 32 should be slightly thicker than the depth of the undercut portions 24, part of the plastic material of the device may be shaved off during rotation but no weakening of the device will result.

Although parts of a flasher are indicated diagrammatically in FIG. 6, no description is deemed necessary as the details thereof are conventional and form no part of the present invention.

The invention has now been described in connection with a single embodiment thereof. It will be apparent from the foregoing description that the invention, by making it possible to eliminate the usual separate mount, saves labor and material, both of which are of vital importance to the industry where every penny counts. Moreover, the provision of the combined cover and mount in accordance with the invention results in a compact device that does not require any particular shaped hole, that will accommodate different designs of flashers and which insures adequate protection of the flasher elements from ambient conditions. Obviously the dimensions and particularly the height of the casing wall can be varied to accommodate flashers of different physical dimensions and the particular shape of the lugs and the spacing therebetween as well as the size of the undercut portions can be varied as described.

The following is claimed:
1. A casing for an electrical device comprising, a unitary molded plastic member having an open end, a closed end, integral mounting lugs extending axially from the closed end, and an inner annular peripheral groove adjacent the open end, whereby when the electrical device which is to be received into said member has a base with the peripheral shape of said groove, the periphery of the base can be resiliently held in said groove.

2. An electrical device comprising, electrical components, an insulating base supporting said components, terminals extending through the base and connected to said components, a unitary molded plastic member enclosing the components, said plastic member having an open end, a closed end, an annular peripheral groove in its inner wall adjacent the open end thereof for resiliently receiving the periphery of the base, said member having plastic lugs formed integrally therewith and extending axially from the closed end thereof for mounting the device in a hole of a restraining wall.

References Cited by the Examiner
UNITED STATES PATENTS

| | | | |
|---|---|---|---|
| 2,318,853 | 5/1943 | Hall | 24—73 |
| 2,805,405 | 9/1957 | Batcheller. | |
| 2,904,617 | 9/1959 | King | 174—138 X |
| 3,067,974 | 12/1962 | Baldwin | 248—27 |
| 3,154,281 | 10/1964 | Frank. | |

LARAMIE E. ASKIN, *Primary Examiner.*

ROBERT K. SCHAEFER, *Examiner.*